Patented Jan. 22, 1952

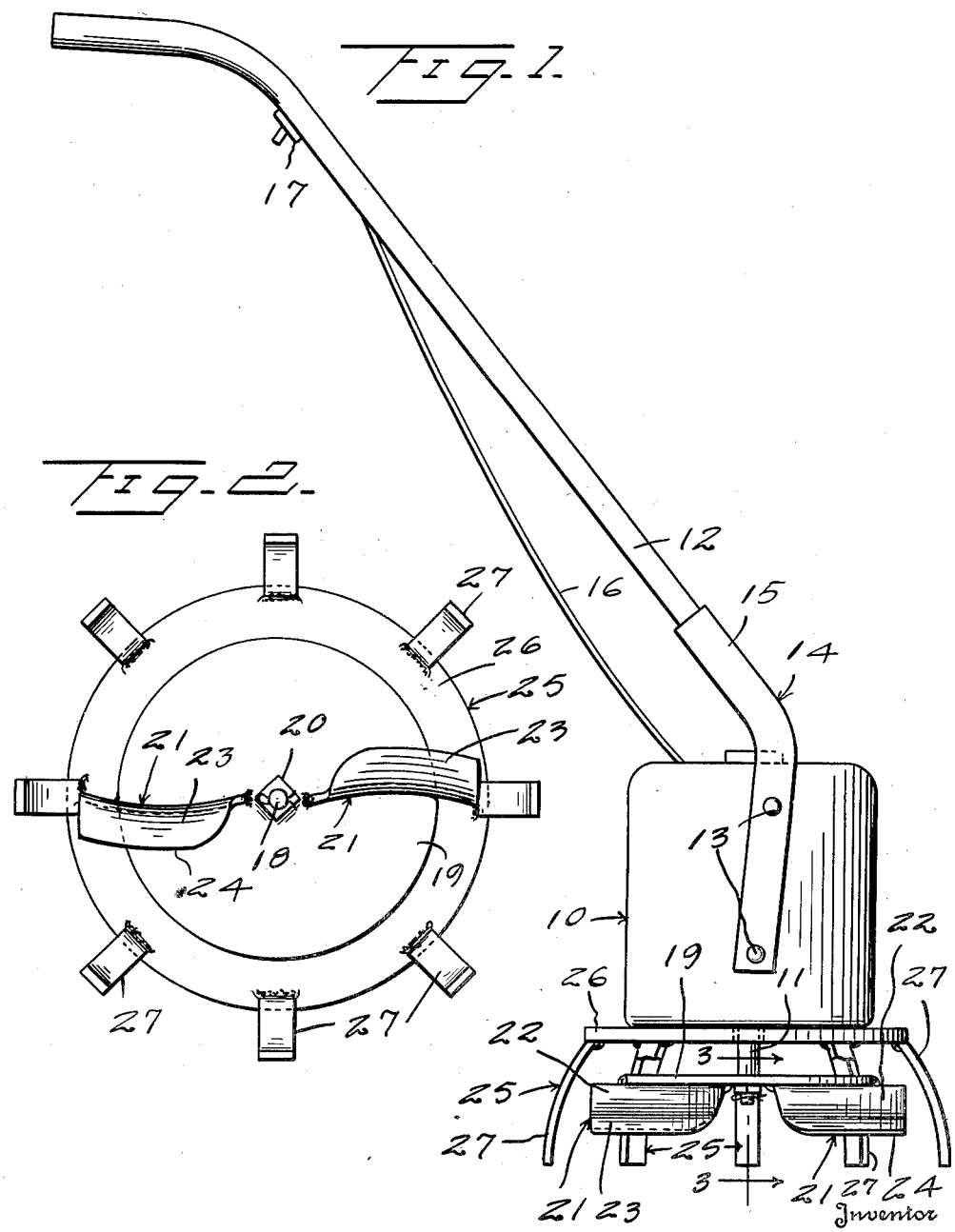

2,583,113

UNITED STATES PATENT OFFICE 2,583,113

GRASS CUTTER

Alvin S. Mogel, Limerick, Pa.

Application February 24, 1948, Serial No. 10,309

1 Claim. (Cl. 30—276)

This invention relates to grass cutters.

An object of this invention is to provide a grass cutter for cutting grass close to trees, monuments or other upstanding articles so as to eliminate the hand trimming of the grass around such articles.

Another object of this invention is to provide a grass cutter which is electrically operated and includes a motor having secured to the shaft thereof a disk-shaped plate carrying at least a pair of cutting blades which are so mounted on the plate that a suction will be formed on the lower side of the plate which will raise fallen grass upright so that the rotating blades will cut the grass evenly.

A further object of this invention is to provide a cutter of this kind which is formed with depending bowed guard fingers extending downwardly from the motor so that the cutter cannot contact any object and will also be held above the ground.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed side elevation, partly broken away, of a grass cutter constructed according to an embodiment of this invention.

Figure 2 is a bottom plan view of the device.

Referring to the drawing, the numeral 10 designates generally an electric motor of conventional construction which is disposed with the longitudinal axis of the motor shaft 11 thereof vertical. The motor 10 is secured to an elongated handle 12 by means of a fork 14 which is secured to the outer side of the motor 10 by fastening devices 13. The fork 14 is formed with an obtusely bent upper portion 15 so that the handle 12 will be disposed on an upward and rearward inclination with respect to the vertical.

The motor 10 has connected therewith a conductor 16 and in the present instance a switch 17 is carried by the upper portion of the handle 12 so that the motor 10 can be readily turned on or off during the use of this device.

The motor shaft 11 is formed with a reduced threaded stud 18 at the lower end thereof on which a blade carrying plate 19 is secured. A nut 20 is threaded onto the stud 18 and tightly holds the plate 19 on the stud 18 and against the shoulder formed where the stud merges into the shaft 11 so as to frictionally hold the plate 19 against rotation relative to the shaft 11. The plate 19 has fixed to the lower side thereof a pair of cutting blades generally designated as 21. These blades 21 are formed with a depending shank 22 which is fixed to the lower side of the plate 19 and the shank 22 at its lower edge has extending obtusely therefrom a blade 23. The shank 22 and the blade 23 are longitudinally curved as shown in Figure 2 and the inner end of the blade 23 terminates short of the center of the plate 19.

The blade 23 is formed at its lower and outer edge with a keen edge 24 which is adapted to cut the grass as the shaft 11 is rotated. As shown in Figure 1 the blades or cutters 21 extend a substantial distance beyond the marginal edge of the plate 19 so that the air which is scooped up by the blades 21 may be forced upwardly and vertically thereby forming a suction on both the lower side of the cutter and at the outer ends thereof. In this manner the bent or fallen grass will be drawn upwardly to substantially an upright position whereby the cutter will be able to cut the grass.

In order to provide a means whereby the cutter will be protected against striking either the surface of the ground or an object such as a tree, monument or other article against which the device engages, I have provided a guard structure generally designated as 25. The guard structure 25 includes a disk-shaped plate 26 which is secured to the lower end of the motor housing by welding or any other well known fastening means and has a diameter substantially greater than the diameter of the motor and also substantially greater than the diameter of the cutter members 21. A plurality of downwardly extending bowed guard fingers 27 are welded to and extend from the lower side of the plate 26, extending loosely about the outer ends of the cutter members 21 and projecting downwardly a substantial distance below the keen edge 24 so that the guard fingers 27 may be engaged with the ground surface and moved along this surface without contact between the surface of the ground and the cutting blade.

In the use and operation of this device the motor 10 is connected through the conductor to a source of electric current supply. The handle 12 is supported in the hands of the user so as to dispose the motor 10 in substantially a vertical position. The device is then guided close to a tree, monument or other object, being disposed either in sliding contact with the surface of the ground or the device may be suspendingly carried through the handle 12 without the guard fingers 27 contacting with the ground. With a device of this kind both long and short grass can be easily and quickly cut inasmuch as where the grass is relatively long the cutter may be moved downwardly over the long grass so as to cut this grass as the device is moved toward the ground surface. Where the grass is not too long the device may be moved in a horizontal direction over the surface of the ground or close to the ground surface and as the cutter is rotated the fallen or bent grass will be drawn upwardly into substantially an upright position where it will be cut by the rotating cutting blade.

I claim:

A rotary grass cutter for use with a motor having a shaft which is substantially vertically disposed, a supporting handle fixed to and extending upwardly from said motor, a mounting disk fixed to said shaft, a pair of diametrically opposed cup-shaped blades of plate form, one end of the plate being attached to the underside of said mounting disk and the opposite end being beveled to form a cutting edge, said blade being longitudinally curved in a radial direction, and a guard means including a second disk-shaped plate fixed to the bottom of the motor and having a central opening adapted to loosely receive said shaft, said second plate having a circumference substantially greater than said first mentioned plate and having a plurality of depending fingers to form a guard about said blades.

ALVIN S. MOGEL.

REFERENCES CITED

The following references are of record in the file of this patent:

UNITED STATES PATENTS

| Number | Name | Date |
| --- | --- | --- |
| 1,827,559 | Beazley | Oct. 13, 1931 |
| 2,091,827 | Mercatoris | Aug. 31, 1937 |
| 2,115,265 | Jennett | Apr. 26, 1938 |
| 2,263,431 | White | Nov. 18, 1941 |
| 2,318,430 | Spahn | May 4, 1943 |
| 2,390,321 | Packwood | Dec. 4, 1945 |